United States Patent
Lee et al.

(10) Patent No.: US 8,626,779 B2
(45) Date of Patent: Jan. 7, 2014

(54) METHOD AND SYSTEM FOR MANAGING DATABASE

(75) Inventors: Hye Jung Lee, Chungcheongnam-do (KR); Kieun Park, Kyunggi-do (KR); Gabyoung Kim, Seoul (KR); Jong Min Lee, Kyunggi-do (KR)

(73) Assignee: NHN Business Platform Corporation, Seongnam-Si (KR)

( * ) Notice: Subject to any disclaimer, the term of this patent is extended or adjusted under 35 U.S.C. 154(b) by 569 days.

(21) Appl. No.: 12/259,956

(22) Filed: Oct. 28, 2008

(65) Prior Publication Data
US 2009/0164415 A1 Jun. 25, 2009

(30) Foreign Application Priority Data
Dec. 21, 2007 (KR) .................. 10-2007-0135615

(51) Int. Cl.
*G06F 7/00* (2006.01)
*G06F 17/30* (2006.01)

(52) U.S. Cl.
CPC .................. *G06F 17/30348* (2013.01)
USPC ........................................................ 707/758

(58) Field of Classification Search
None
See application file for complete search history.

(56) References Cited

U.S. PATENT DOCUMENTS

| | | | | |
|---|---|---|---|---|
| 6,122,644 A * | 9/2000 | Graefe et al. | ............ | 1/1 |
| 6,366,901 B1 * | 4/2002 | Ellis | ............ | 1/1 |
| 6,374,263 B1 * | 4/2002 | Bunger et al. | ............ | 1/1 |
| 6,694,322 B2 * | 2/2004 | Warren et al. | ............ | 1/1 |
| 6,748,393 B1 * | 6/2004 | Kapoor et al. | ............ | 1/1 |
| 7,016,914 B2 * | 3/2006 | Nayak | ............ | 1/1 |
| 7,272,591 B1 * | 9/2007 | Ghazal et al. | ............ | 1/1 |
| 7,448,047 B2 * | 11/2008 | Poole et al. | ............ | 719/316 |
| 7,467,349 B1 * | 12/2008 | Bryar et al. | ............ | 715/205 |
| 7,624,094 B2 * | 11/2009 | Ellis et al. | ............ | 1/1 |
| 7,627,564 B2 * | 12/2009 | Yao et al. | ............ | 1/1 |
| 7,676,451 B2 * | 3/2010 | Burger et al. | ............ | 707/687 |
| 7,711,730 B2 * | 5/2010 | Bernal et al. | ............ | 707/718 |
| 7,716,213 B2 * | 5/2010 | Cotner et al. | ............ | 707/718 |
| 7,747,610 B2 * | 6/2010 | Chinchwadkar et al. | ............ | 707/716 |
| 7,831,592 B2 * | 11/2010 | Markl et al. | ............ | 707/718 |
| 7,849,080 B2 * | 12/2010 | Chang et al. | ............ | 707/723 |
| 7,908,264 B2 * | 3/2011 | Bohannon et al. | ............ | 707/713 |
| 7,921,107 B2 * | 4/2011 | Chang et al. | ............ | 707/723 |
| 7,979,457 B1 * | 7/2011 | Garman | ............ | 707/768 |
| 8,108,390 B2 * | 1/2012 | Manavoglu et al. | ............ | 707/736 |

(Continued)

OTHER PUBLICATIONS

"12.2.10. Update Syntax" from MySQL 5.0 Reference Manual. Available online at http://dev.mysql.com/doc/refman/5.0/en/update.html. Copyright 2011.*

(Continued)

*Primary Examiner* — Jay Morrison
(74) *Attorney, Agent, or Firm* — Harness, Dickey & Pierce, P.L.C.

(57) ABSTRACT

A method and system for managing database is disclosed, which is capable of simultaneously performing a data selection procedure and a data click-count update procedure when specific data is selected, the method comprising receiving and analyzing a query in which both a fetch request for a record included in a specific database table and an update request for at least one of columns included in the record are defined together; generating an execution plan to execute the analyzed query; and executing the execution plan by fetching the record and updating at least one of the columns according to the execution plan.

25 Claims, 5 Drawing Sheets

(56) References Cited

U.S. PATENT DOCUMENTS

| | | | |
|---|---|---|---|
| 2002/0126545 A1* | 9/2002 | Warren et al. | 365/200 |
| 2003/0144868 A1* | 7/2003 | MacIntyre et al. | 705/1 |
| 2003/0154442 A1* | 8/2003 | Papierniak | 715/501.1 |
| 2004/0019587 A1* | 1/2004 | Fuh et al. | 707/2 |
| 2005/0138010 A1* | 6/2005 | Bernal et al. | 707/3 |
| 2005/0246717 A1* | 11/2005 | Poole et al. | 719/316 |
| 2006/0064411 A1* | 3/2006 | Gross et al. | 707/3 |
| 2006/0287993 A1* | 12/2006 | Yao et al. | 707/4 |
| 2006/0294058 A1* | 12/2006 | Zabback et al. | 707/2 |
| 2007/0260611 A1* | 11/2007 | Bohannon et al. | 707/10 |
| 2008/0114803 A1* | 5/2008 | Chinchwadkar et al. | 707/102 |
| 2008/0133454 A1* | 6/2008 | Markl et al. | 707/2 |
| 2008/0255937 A1* | 10/2008 | Chang et al. | 705/14 |
| 2008/0256039 A1* | 10/2008 | Chang et al. | 707/3 |
| 2008/0256056 A1* | 10/2008 | Chang et al. | 707/5 |
| 2008/0256059 A1* | 10/2008 | Chang et al. | 707/5 |
| 2008/0256060 A1* | 10/2008 | Chang et al. | 707/5 |
| 2008/0256061 A1* | 10/2008 | Chang et al. | 707/5 |
| 2008/0270368 A1* | 10/2008 | Cotner et al. | 707/4 |
| 2008/0275840 A1* | 11/2008 | Burger et al. | 707/2 |
| 2008/0281700 A1* | 11/2008 | Koran | 705/14 |
| 2009/0024584 A1* | 1/2009 | Dharap et al. | 707/3 |

OTHER PUBLICATIONS

"Acid" from Wikipedia. Available online at http://en.wikipedia.org/wiki/ACID. Nov. 19, 2011.*

Härder, Theo; Reuter, Andreas (Dec. 1983). "Principles of Transaction-Oriented Database Recovery" (PDF). ACM Computing Surveys 15 (4): 287-317.*

Behm, Andreas, Serge Rielau, and Richard Swagerman. "Returning modified rows-select statements with side effects," Proceedings of the Thirtieth international conference on Very large data bases—vol. 30. VLDB Endowment, 2004.*

* cited by examiner

METHOD AND SYSTEM FOR MANAGING DATABASE

CROSS-REFERENCE TO RELATED APPLICATION

This application claims the benefit of Korean Patent Application No. 10-2007-0135615, filed on Dec. 21, 2007, which is hereby incorporated by reference as if fully set forth herein.

BACKGROUND OF THE INVENTION

The present invention relates to a method for managing a database, and more particularly, to a method and system for managing a database, which is capable of updating data stored in the database with high efficiency.

A database management system (hereinafter, referred to as "DBMS") is provided to manage a database with large amounts of data. Such a database management system is essential in recent environments where there are large amounts of new information that is created continuously.

The DBMS stores data in type of table in the database, wherein the database table is a basic architecture for storing the data in the database. One database table is comprised of one or more records. At this time, the record indicates one row in the database table. Each record is comprised of one or more columns, wherein the column indicates a domain with a name expressing a table item in a real world for the database table, for example, which can be referred to as an attribute or field.

When a specific query is input to the DBMS, the DBMS performs functions of selecting, inserting, updating and deleting the data in the database according to the input query. In this case, the query indicates a specific request for the data stored in the table of database, that is, the query shows an operation required for the data. The query is expressed as a language such as SQL (Structured Query Language).

The most typical query in the SQLs is "SELECT". Through the use of SELECT query, the data in the table can be obtained. Also, when the data is separately stored in the several tables, the desired data in the specific table can be obtained with reference to the data stored in the other tables.

For example, in case of the SQL syntax such as "SELECT content FROM board WHERE id=10", it indicates the request for selecting the record which satisfies "id=10" from the table "board".

If the DBMS is used for a bulletin board service, especially, a specific content is selected by a user, the DBMS receives a query from a bulletin board service providing server, wherein the query includes "SELECT" language for the request of the corresponding content and "UPDATE" language for the request of click-count increment of the corresponding content. According to the received query, the DBMS selects the corresponding content, and updates the click count of the selected content.

On provision of the specific content selected by a user in the system according to the prior art, even though selecting the corresponding content should be necessarily accompanied with the increment of click count, the two procedures are performed by the separate queries, thereby lowering the system efficiency.

However, when the update of record included in the specific table is performed in the prior art DBMS, the corresponding record is locked until when completing a transaction for the update of the corresponding record. Thus, it is impossible to perform the procedures of SELECT query and UPDATE query at the same time, thereby deteriorating simultaneity in use of the database.

In the prior art DBMS, when performing the update of record included in the specific table, the update result is reflected on the table every time the update is performed, whereby the system efficiency deteriorates with increasing counts of updates.

SUMMARY OF THE INVENTION

Therefore, the present invention has been made in view of the above problems, and it is an object of the present invention to provide a method and system for managing database, which is capable of simultaneously performing a data selection procedure and a data click-count update procedure when specific data is selected.

It is another object of the present invention to provide a method and system for managing database, which can minimize a locking duration of corresponding data.

It is another object of the present invention to provide a method and system for managing database, which can reflect updated results on Database periodically.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a database-managing method comprises receiving and analyzing a query in which both a fetch request for a record included in a specific table and an update request for at least one of columns included in the record are defined together; generating an execution plan to execute the analyzed query; and executing the execution plan by fetching the record and updating at least one of the columns according to the execution plan.

At this time, analyzing the query comprises receiving the query; parsing the received query; and checking a validation for the parsed query.

At this time, analyzing the query further comprises generating a parse tree for the query through the use of parsing results after parsing the query, wherein the validation of the generated parse tree is checked in the step of checking the validation for the parsed query, and wherein the execution plan for the valid parse tree is generated in the step of generating the execution plan.

Also, the record is content included in a specific bulletin board, and at least one column includes a column with a click count for the content.

Executing the execution plan comprises generating a transaction to execute the execution plan; fetching the record from the table; obtaining a value recorded in the update-requested column among the fetched records; updating the obtained value recorded in the column; and completing the transaction by noticing the update completion. Also, executing the execution plan further comprises generating a sub-transaction before updating the value recorded in the column; and completing the sub-transaction after updating the value recorded in the column, wherein the update of the value recorded in the column is performed in the sub-transaction. At this time, locks for the table and record are set during a period of processing the sub-transaction for the update of the column.

Also, fetching the record is performed by any one of sequential-scanning method or index-scanning method. At this time, the index for the column as well as the value recorded in the column is updated when an index for the update-requested column exists in the step of executing the execution plan.

Furthermore, the database-managing method comprises matching an entry comprised of a record ID and a column ID with the value of the column corresponding to the column ID included in the entry, and storing the entry and column value matched with each other in the memory, wherein executing the execution plan comprises updating the column value matched with the entry for the update-requested column in the memory when performing the update for the column according to the update request for the column; and reflecting the column value kept in the memory on the table when a specific condition is satisfied.

At this time, the column value is reflected on the table when it is possible to satisfy at least any one of cases that the column value kept in the memory is above a first reference value, and the column value is maintained for a time period longer than a second reference value from a finally-updated time point in the step of reflecting the column value.

In another aspect of the present invention, a database-managing system comprises a query analyzer configured to receive and analyze a query in which both a fetch request for a record included in a specific table and an update request for at least one of columns included in the record are defined together; an execution plan generator configured to generate an execution plan to execute the analyzed query; and an execution plan executor configured to execute the execution plan by fetching the record and updating at least one of the columns according to the execution plan.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, a method and system for managing database according to the present invention will be described with reference to the accompanying drawings.

Figure 1:
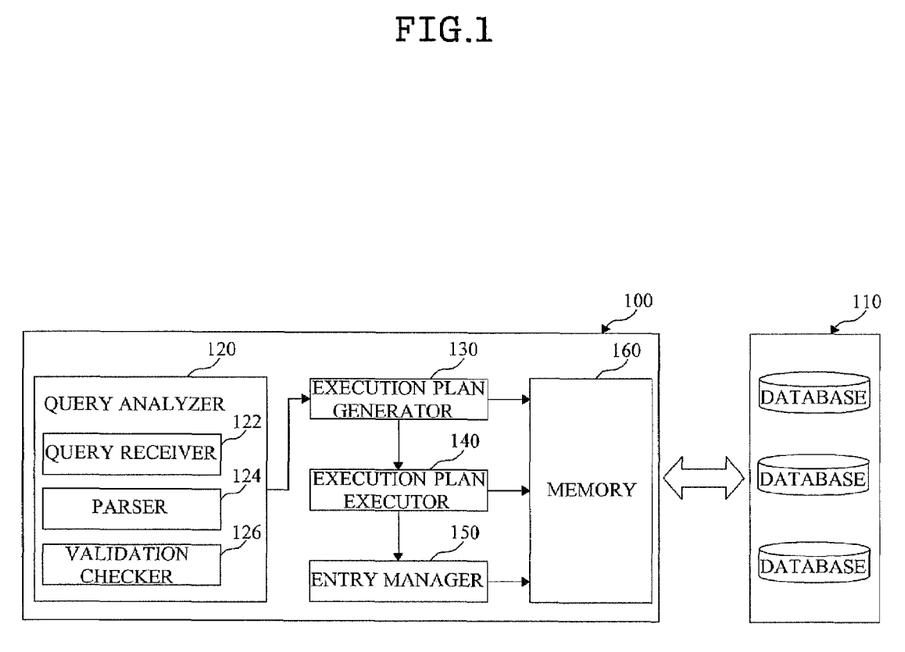
FIG. 1 is a block diagram illustrating a database-managing system according to one embodiment of the present invention.

FIG. 1 is a block diagram illustrating a database-managing system according to one embodiment of the present invention.

Data of various kinds is stored as a table format in a database 110. As mentioned above, each table is comprised of one or more records, and each record is comprised of one or more columns. For example, in a case of database with contents on a specific bulletin board, the table indicates a group of the contents, the record indicates each of the contents, and the column indicates an area for storing a content ID, a content writer, and a content click-count.

The database-managing system 100 performs an integrated database-managing function, that is, the database-managing system 100 connected with the database 110 updates or deletes data recorded in the database 110, or adds data to the database 110. The database-managing system 100 includes a query analyzer 120, an execution plan generator 130, and an execution plan executor 140.

The query analyzer 120 receives queries stored in the database 110 from an external server (not shown) or a manager terminal (not shown) linked with the database-managing system 100, and then analyzes the received queries.

As shown in FIG. 1, the query analyzer 120 includes a query receiver 122, a parser 124, and a validation checker 126.

The query receiver 122 receives the queries from the external server or manager terminal. In this case, the queries received through the query receiver 122 can be written through the use of SQL (structured query language).

In one embodiment of the present invention, the query receiver 122 receives the query in which both a fetch request for the specific record stored in the database 110 and an update request for the column of the specific record are defined together. In this case, the query, in which both the fetch request for the specific record stored in the database 110 and the update request for the column of the specific record are defined together, means the query written to perform procedures for fetching contents and updating the click-count of contents at one time, with notice that the fetch request for the specific content in the database 110 is accompanied with the update request for the corresponding column of the specific content when the record corresponds to the content.

The case of writing the query using the SQL is as follows.
1) SELECT content, INCR(counter) FROM board
2) SELECT content, INCR(counter)+1 FROM board
3) SELECT content, FROM board WITH INCREMENT FOR counter The aforementioned query is "SELECT" for defining the fetch of specific record, wherein "content" indicates the record to be fetched, "counter" indicates the column with the click-count among the columns, "board" indicates the table with the corresponding record, and "INCR( )" indicates a function for increasing a specific column value such as the click-count of "SELECT".

For convenience of the explanation, supposing that the update-requested column corresponds to the column with the click-count recorded therein. It is apparent for those skilled in the art that the column is not limited to the column with the click-count recorded therein.

The parser 124 generates a parse tree by parsing the query received through the query receiver 122. In one embodiment of the present invention, the parser 124 may transform the queries expressed in various types into one syntax type, and generate the parse tree for the transformed syntax type.

For example, when receiving the SQL query of 1) through the query receiver 122, it is possible to parse the SQL query as it is. However, when receiving the SQL queries of 2) and 3), the parser 124 transforms the received queries into the following types.

2) SELECT content, INCR(counter)+1 FROM board
      → SELECT content, counter+1, <INCR(counter)> FROM board
   3) SELECT content, FROM board WITH INCREMENT FOR counter
      → SELECT content, <INCR(counter)> FROM board At this time, <INCR(counter)> indicates a hidden column, that is, the column of "counter" is not included in the result for the query.

The validation checker 126 performs examination of the meaning of the parse tree generated by the parser 124. That is, the validation checker 126 checks whether or not the column or table in the parse tree exists, and whether or not the data type of the column can be compatible with an operator.

In one embodiment of the present invention, if "INCR( )" function is included in the received query, the validation checker 126 checks at least one of the following three: whether or not the column corresponding to one component of the corresponding function is included in the corresponding table; whether or not the left-sided item has the right-sided item as a domain in an expression when the component is a path expression; and whether or not the data type of component is an integral type.

The validation checker 126 transforms the function of "INCR(counter)" into "INCR(board, ID(counter))" by adding the component for processing of the corresponding function to the function "INCR(counter)" included in the received query. At this time, "board" indicates an identifier (ID) for the specific record included in the board table, wherein "board" shows a physical location of the specific record. Also, "ID (counter)" indicates an ID for the counter column. This information is used for searching the specific record and the location of corresponding column in the specific record.

The execution plan generator 130 generates an execution plan for fetching the requested record based on the parse tree determined to be valid, and updating the column included in the record, and then stores the generated execution plan in a memory 160. At this time, the execution plan indicates a data architecture including a method for fetching the record from the specific table, a result record list, and whether or not there is an increment operation for the update-requested column.

In one embodiment of the present invention, the execution plan generator 130 may select any one from the following two methods to fetch the requested record from the specific table, that is, a sequential-scanning method and an index-scanning method. At this time, the sequential-scanning method fetches the record with the corresponding ID by sequentially scanning the records included in the specific table. The index-scanning method fetches the corresponding record by scanning a corresponding index since the index is generated by each ID of the record.

The execution plan executor 140 fetches the corresponding record from the specific table according to the execution plan generated by the execution plan generator 130. Also, the execution plan executor 140 updates the corresponding column value by performing an increment operation for the column value recorded in the column of the record corresponding to the physical location of the update-requested column.

In more detail, the execution plan executor 140 generates a transaction to execute the execution plan generated by the execution plan generator 130, to thereby process the generated execution plan during the corresponding transaction. In this case, the transaction indicates one logical working unit, which is defined by one or more SQLs. The transaction secures data consistency and data simultaneity.

First, the execution plan executor 140 performs the procedure of fetching the corresponding record from the specific table in the transaction. In this case, the aforementioned sequential-scanning method or index-scanning method may be used for access to the corresponding record.

In one embodiment of the present invention, when fetching the record, the execution plan executor 140 sets an IS-lock for the corresponding table with starting the scanning of corresponding table, and sets an S-lock for the corresponding record. When the scanning of the corresponding table is completed, the set IS-lock and S-lock are released.

In the meantime, the execution plan executor 140 generates the updated record by obtaining the column value recorded in the column of the record corresponding to the physical location of the update-requested column and applying the increment in the obtained column value, and the updates the column value of the corresponding column by overlapping the updated record with the original record.

In one embodiment of the present invention, the execution plan executor 140 additionally generates a sub-transaction in the aforementioned transaction so as to update the corresponding column value, and makes the corresponding column value updated in the sub-transaction. In this case, with generation of the sub-transaction, the execution plan executor 140 sets an IX-lock in the table with the corresponding record, and sets an X-lock in the corresponding record, to thereby prevent the simultaneous access to the corresponding table and record, and to release the set IX-lock and X-lock with completion of the sub-transaction.

Generally, when trying to update the column value, the lock is set for the corresponding table and record from the update point of column value, and the set lock is released with completion of commit for reflecting the updated column value on the database. In the present invention, the sub-transaction is additionally generated in the transaction for the update of column value. Thus, the lock is set for the corresponding table and record with starting the sub-transaction, and then the set lock is released with completion of the sub-transaction.

Figure 2A:
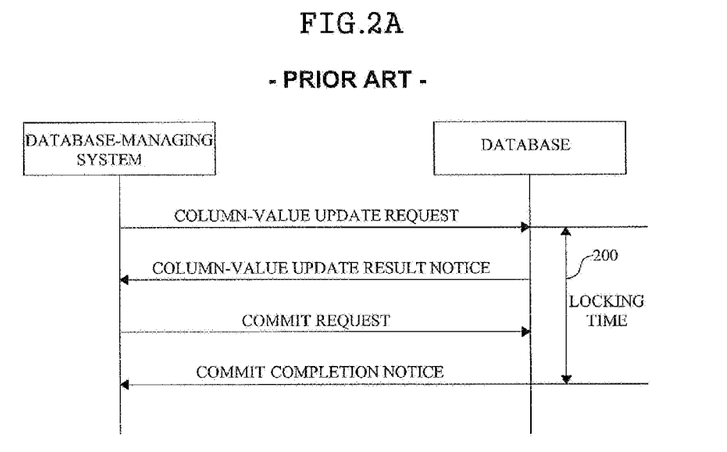
FIG. 2 is a flow chart comparing a locking duration on a column-update request process according to the present invention with a locking duration on a column-update request process according to the prior art.
Figure 2B:
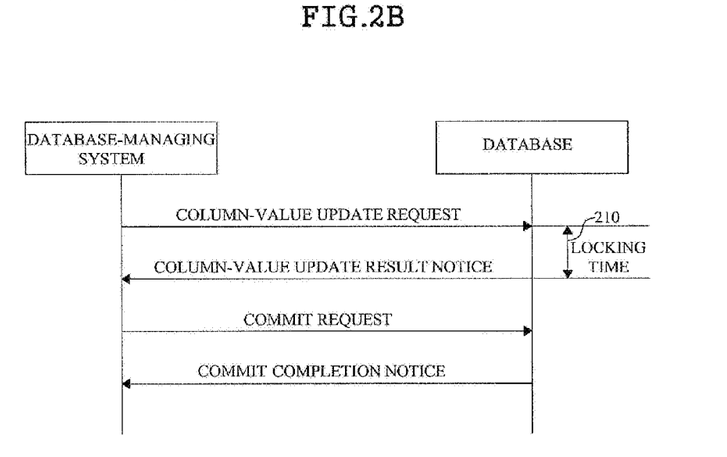

FIG. 2 illustrates the schematized locking duration between the prior art and the present invention. As shown in FIG. 2A illustrating the locking duration in the column value update process according to the prior art, the locking for prevention of data access is maintained for a period 200 from the point of requesting the update of column value to the point of completing the commit. As shown in FIG. 2B illustrating the locking duration in the column value update process according to the present invention, the locking for prevention of data access is maintained only for the processing time of sub-transaction, that is, period 210 from the point of requesting the update of column value to the point of completing the notice about the update result of column value.

In the case of the prior art, the lock is continuously set for the corresponding table and record until when completing the commit from the point of requesting the update of column value, thereby lowering data simultaneity. However, in the case of the present invention, even though the commit is not completed, the lock is released with the completion of update of column value, thereby improving data simultaneity owing to the decreased locking duration in comparison to the prior art.

If there is the index for the update-requested column, the execution plan executor 140 can update the column included in the index. In more detail, if the column value of the update-requested column is updated and the index for the corresponding column exists, the execution plan executor 140 deletes a prior-version key for the corresponding column from the index, and adds a new-version key to the index.

In one embodiment of the present invention, the execution plan executor 140 can store information about the update of column value as a log type. If receiving a rollback request from the external server or manager terminal, the updated column value is restored to the original column value. Thus, the execution plan executor 140 stores the information of updated column value such as the update time and the original column value as the log type.

When completing the procedure for fetching the corresponding record and updating the column included in the corresponding record, the execution plan executor 140 performs the commit to reflect the updated result on the database 110, to thereby complete the transaction for processing the received query.

In the aforementioned embodiment of the present invention, when the update of column value for the corresponding column is completed, the execution plan executor 140 directly reflects the updated result on the database 110. However, in the modified embodiment of the present invention, the updated column values are temporarily stored in the memory, and are reflected on the database 110 at one time when a specific condition is satisfied.

If the click count for the specific record such as the content is increased rapidly, it may require the frequent update of column such as the click count for the corresponding content. In this case, if the updated result is reflected on the database 110 every time the update is performed, the system efficiency may be deteriorated.

In one embodiment of the present invention, the execution plan executor 140 can determine whether or not the updated column value is reflected on the database 110 by checking whether or not the column value stored in the memory 160 is above a first reference value, or whether or not the corresponding column value is maintained for a time period longer than a second reference value from the finally-updated time point.

For this, the database-managing system 100 includes an entry manager 150 which generates or deletes an entry comprised of the ID of record and the ID of the update-requested column, matches the generated entry with the column value corresponding to the column ID included in the entry, and stores them in the memory 160. That is, the column value of the update-requested column is stored in the memory 160 while being matched with the entry generated in the entry manager 150.

In one embodiment of the present invention, the entry manager 150 generates a hash table, and stores the column value corresponding to the column ID included in the entry matched with each hash key while serving the entry comprised of the ID of the record and the ID of the update-requested column as the hash key.

The procedure for storing the column value updated through the entry manager 150 and the memory 160 in the memory 160 by the execution plan executor 140 will be explained as follows.

Upon receiving the update request for the column value of the specific column, the execution plan executor 140 determines whether or not there is the entry including the ID of the update-requested column in the memory 160. If there is no entry, the execution plan executor 140 provides the request for addition of the entry to the entry manager 150.

If the corresponding entry exists in the memory 160, or the entry is added by the entry manager 150, the execution plan executor 140 determines whether or not the aforementioned condition for the column value matched with the corresponding entry is satisfied. If it is satisfied, the column value matched with the corresponding entry is reflected on the database 110 while requesting the deletion of the corresponding entry.

If it is not satisfied, the execution plan executor 140 updates the column value matched with the entry in the memory 160, thereby processing the update request.

In the meantime, if the execution plan executor 140 requests the addition of entry, the entry manager 150 determines whether or not the entry can be added in the memory 160. If it is determined that the entry can not be added in the memory 160, any one of the entries stored in the memory 160 is deleted, and then the new entry is added thereto.

Figure 3:
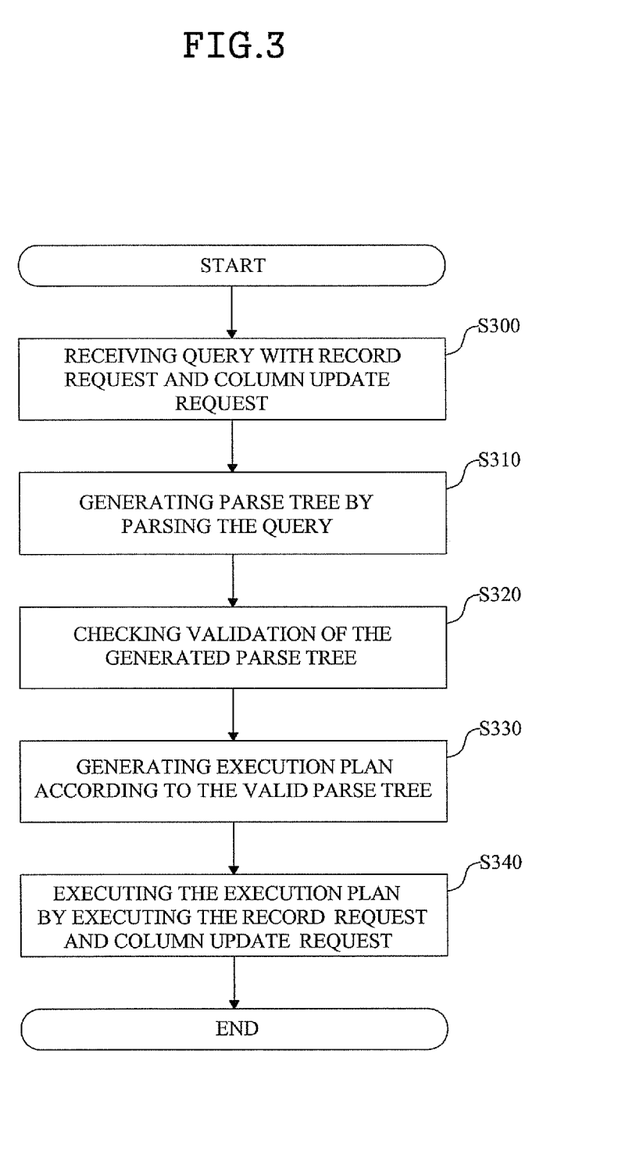
FIG. 3 is a flow chart illustrating a database-managing method according to one embodiment of the present invention.

A method for managing the database according to one embodiment of the present invention will be explained with reference to FIG. 3.

First, the query with the requests for fetching the record included in the specific table and updating any one of the columns included in the corresponding record is received from the external server or manager terminal in step 300. In one embodiment of the present invention, the query may use the SQL (Structured Query Language).

At this time, the query with the requests for fetching the specific record and updating any one of the columns included in the corresponding record indicates the query which can perform the procedures of fetching the corresponding content and updating the click count of the corresponding content at the same time, with notice that the fetch request for the content in the database is necessarily accompanied with the update request of the click count for the corresponding content when the record corresponds to the content.

Then, the parse tree is generated by parsing the received query in S310. In one embodiment of the present invention, if the received query is expressed in various types, the received query is transformed into one syntax type, and then the parse tree for the transformed syntax is generated.

After that, the meaning examination for the generated parse tree is performed in S320. The meaning examination for the generated parse tree relates with whether or not the table or column expressed in the parse tree exists, and whether or not the data type of the column can be compatible with the operator. In one embodiment of the present invention, if the "INCR( )" function is included in the received query, it is possible to check at least any one of the following three: whether or not the column corresponding to the component of corresponding function is included in the corresponding table, whether or not the left-sided item has the right-sided item as the domain in the expression when the component is the path expression; and whether or not the data type of component is the integral type.

On checking the validation of parse tree, the component for processing the function "INCR(counter)" included in the received query is added to the "INCR(counter)" function, whereby the "INCR(counter)" function is transformed into the function "INCR(board, ID(counter))". In this cases "board" indicates the ID for the specific record included in the board table, and "ID(counter)" indicates the ID for the counter column.

When it is determined that the parse tree for the received query is valid, the execution plan for fetching the corresponding record and updating the column included in the record is performed based on the corresponding parse tree in S330. In this case, the execution plan indicates the data architecture including the method for fetching the record from the specific table, the result record list, and whether or not there is the increment operation for the update-requested column.

According to the generated execution plan, the execution plan is executed by fetching the corresponding record from the specific table, and updating the column value of the update-requested column among the columns of the corresponding record in S340.

Figure 4:
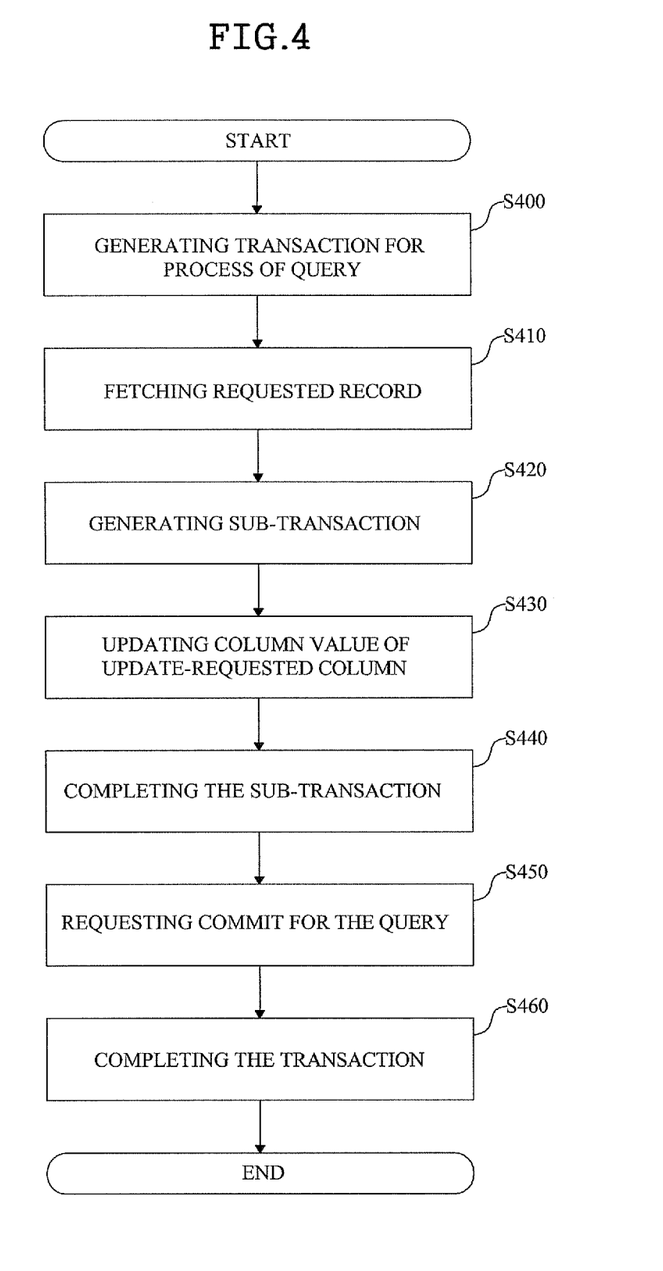
FIG. 4 is a flow chart illustrating a detailed execution procedure of execution plane shown in FIG. 3.

The procedure of executing the execution plan will be explained with reference to FIG. 4.

First, when the execution plan is generated, the transaction for the process of the corresponding query according to the generated execution plan is generated in S400. During the process for the generated transaction, the corresponding record is fetched and any one of the columns included in the corresponding record is updated. The detailed explanation about the transaction will be omitted since it is shown in the aforementioned part for explaining the execution plan generator.

In order to process the record-fetching request in the generated transaction, the corresponding record is fetched from the table in S410. In one embodiment of the present invention, the access to the corresponding record in the table may be performed by the sequential-scanning method or index-scanning method. At this time, the IS-lock for the corresponding table is set and the S-lock for the corresponding record is set with starting the scanning of table. Then, the set IS-lock and S-lock are released with completion of the table scanning.

Then, the sub-transaction for updating the column value of the update-requested column is generated in S420. That is, according as the sub-transaction is additionally generated in the transaction, the update of the column value is performed in the sub-transaction. In order to prevent the simultaneous access of data, the IX-lock is set for the table including the corresponding record, and the X-lock is set for the corresponding record with generation of the sub-transaction.

Thereafter, the column value of the update-requested column is updated in the sub-transaction in S430. In more detail, after obtaining the column value recorded in the column of the record corresponding to the physical location of the update-requested column, the increment is applied to the obtained column value, thereby generating the updated record. Then, the updated record is overlapped with the original record so that the column value of the corresponding column is updated.

When updating the column value of the update-requested column, the information about the updated time of the column value and the original column value can be stored as the log type in the database for provision against the case there is the rollback request received from the external server or manager terminal.

When the update of column value is completed, the sub-transaction is completed so that the set locks are released in S440. To reflect the update result on the database 110, the commit is requested in S450. When the commit is completed, the transaction for the process of query is completed in S460.

In the aforementioned embodiment of the present invention, the update result of the update-requested column is directly reflected on the database. However, in order to prevent the system efficiency from being deteriorated, the updated column values may be temporarily stored in the memory, and reflected on the database at one time when the specific condition is satisfied.

Figure 5:
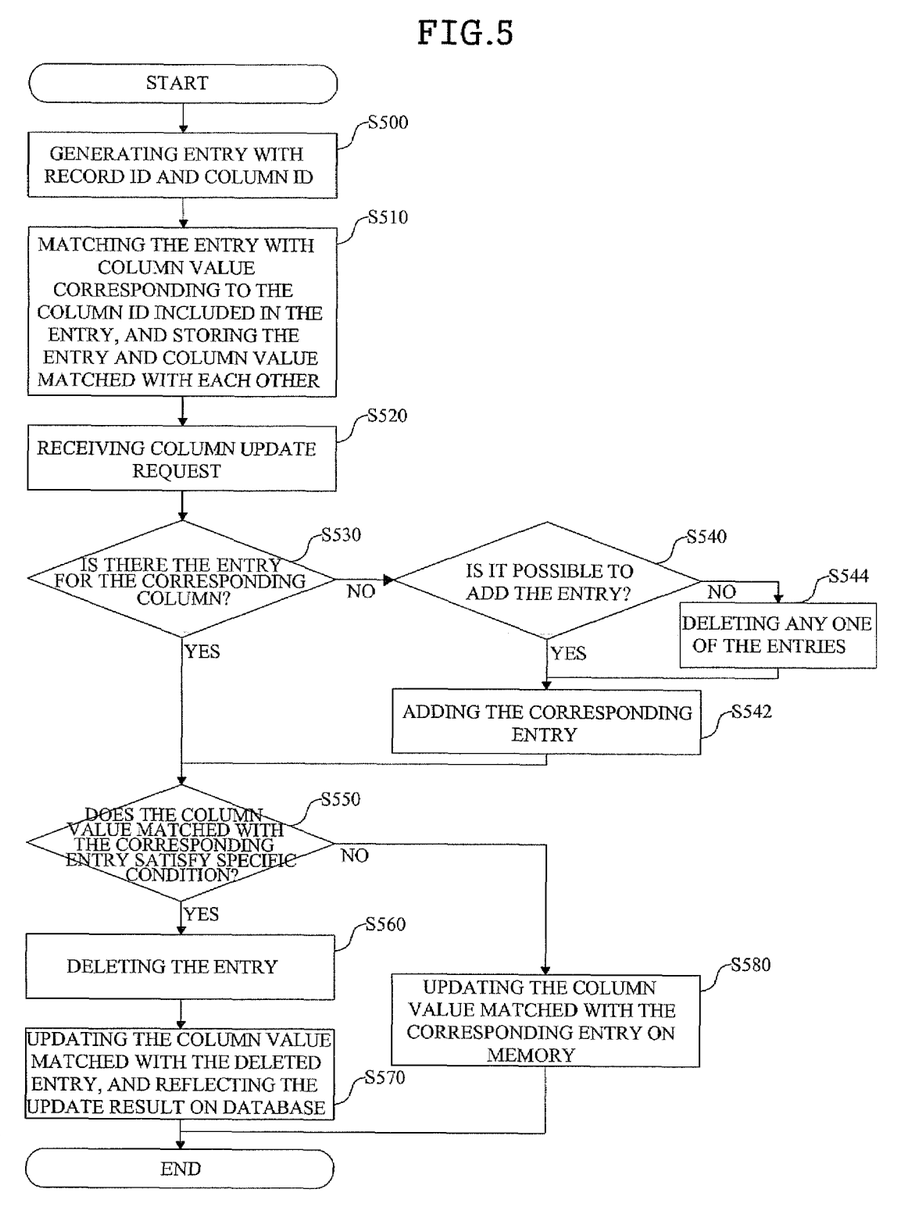
FIG. 5 is a flow chart illustrating database-managing method according to another embodiment of the present invention.

The method of temporarily storing the update column values in the memory and reflecting the temporarily stored result on the database at one time when the specific condition is satisfied will be explained with reference to FIG. 5.

First, the entry is generated in S500, wherein the entry includes one pair comprised of the ID of record included in the specific table and the ID of column included in the corresponding record. Then, the entry and the column value corresponding to the ID of column included in the corresponding entry are stored through the use of the hash table in S510.

When the update request for any one of the columns included in the specific record is received in S520, it is determined whether or not the entry including the ID of the corresponding column exists in the memory in S530.

Accordingly, when it is determined that there is no corresponding entry, it is checked whether or not the entry can be added to the memory in S540. If it is determined that the entry can be added to the memory, the entry is added in S542. If it is determined that the entry can not be added to the memory, any one of the entries stored in the memory is deleted in S544, and then the corresponding entry is added in 542.

In the meantime, if it is determined that the corresponding entry exists in S530, or the corresponding entry is added in S542, it is determined whether or not the specific condition for the column value matched with the corresponding entry is satisfied in S550. In one embodiment of the present invention, the specific condition is related with whether or not the column value matched with the corresponding entry is above the first reference value, or whether or not the column value matched with the corresponding entry is maintained for the time period longer than the second reference value from the finally-updated time point.

When the specific condition is satisfied, the corresponding entry is deleted in S560, the column value matched with the deleted entry is updated, and then the updated column value is directly reflected on the database in S570.

If the specific condition is not satisfied, the column value matched with the corresponding entry is updated on the memory, thereby processing the update request in S580.

In the aforementioned embodiment of the present invention, after determining whether or not the specific condition is satisfied, the column value is updated. However, in the modified embodiment of the present invention, the column value is firstly updated, and then it is determined whether or not the updated column value satisfies the specific condition.

Also, in the aforementioned embodiment of the present invention, the entry for the specific record and column is generated previously. However, in the modified embodiment of the present invention, instead of previously generating the entry, the record including the corresponding column and the entry for the corresponding column are generated when the update request for the specific column is received, and the corresponding entry is stored while being matched with the column value of the corresponding column.

The aforementioned database-managing method can be implemented in type of programs executed by various computers. In this case, the programs to execute the database-managing method are stored in computer-readable record media, for example, hard-disc, CD-ROM, DVD, ROM, RAM or flash memory.

According to the present invention, when the specific data is selected, the procedures of selecting the corresponding data and updating the click count of the corresponding data are performed at the same time, thereby enhancing the process speed of the data and maximizing the user's convenience.

Also, when performing the update of the specific data, the lock for the data is set only in the sub-transaction for performing the update of the specific data, so that it is possible to decrease the locking duration for the data.

When the specific data is updated, the update result is periodically reflected on the database instead of being reflected every time the update is performed, whereby the system efficiency can be improved with the decreased data input/output count.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A computer-implemented database-managing method comprising:
   receiving and analyzing, by the computer, a single statement that comprises a fetch request for a record in a database table and an update request for updating at least one column;
   generating an execution plan to execute the single statement, the execution plan including a locking time for preventing access to the record while the single statement is processed, the locking time ending once the single statement is processed and before the update request is made permanent;
   matching an entry comprised of a record ID and a column ID with a column value corresponding to the column ID included in the entry, and storing the entry and column value matched with each other in a memory;
   executing the execution plan by fetching the record in accordance with the fetch request and updating the at least one column in accordance with the update request, the executing including,
      updating the column value matched with the entry according to the update request,
      reflecting the column value kept in the memory on the database table in response to a specific condition being satisfied, and
      updating a click count of content in the corresponding column; and
   presenting the record in accordance with the fetch request.

2. The computer-implemented database-managing method of claim 1, wherein the analyzing the statement comprises:
   receiving the statement;
   parsing the received statement; and
   checking validation for the parsed statement.

3. The computer-implemented database-managing method of claim 2, wherein the analyzing the statement further comprises generating a parse tree for the statement through the use of parsing results after parsing the statement, the validation of the generated parse tree is checked in the checking the validation for the parsed statement, and the execution plan for the valid parse tree is generated in the generating the execution plan.

4. The computer-implemented database-managing method of claim 1, wherein the record comprises content in a specific bulletin board.

5. The computer-implemented database-managing method of claim 1, wherein the executing the execution plan comprises:
   generating a transaction to execute the execution plan;
   fetching the record from the database table;
   obtaining a value recorded in at least one of the columns requested for the update among the fetched record;
   updating the obtained value recorded in the column; and
   completing the transaction by noticing completion of the update.

6. The computer-implemented database-managing method of claim 5, wherein the executing the execution plan further comprises:
   generating and executing a sub-transaction to update the information recorded in the column.

7. The computer-implemented database-managing method of claim 6, wherein locks for the database table and record are set during a period of processing the sub-transaction for the update of the column.

8. The computer-implemented database-managing method of claim 5, wherein the fetching the record is performed by a sequential-scanning method, an index-scanning method, or both the sequential-scanning method and the index-scanning method.

9. The computer-implemented database-managing method of claim 1, wherein an index for the column and the value recorded in the column are updated in response to a determination that the index for the column exists in the execution plan.

10. The computer-implemented database-managing method of claim 1, wherein the column value is reflected on the database table in response to a determination that the column value kept in the memory is greater than a first reference value, or a determination that the column value is maintained for a time period longer than a second reference value from a finally-updated time point in the reflecting the column value.

11. The computer-implemented database-managing method of claim 1, wherein the entry and column value are stored through the use of a hash table.

12. The computer-implemented database-managing method of claim 1, wherein updating the column value comprises determining whether the entry for the column exists, and updating the column value matched with the entry in response to a determination that the entry for the column exists.

13. The computer-implemented database-managing method of claim 12, further comprising:
   adding the entry for the column in response to a determination that there is no entry for the column; and
   storing the column value of the column in the memory, the column value being matched with the added entry.

14. The computer-implemented database-managing method of claim 13, wherein the adding the entry comprises:
   determining whether the entry can be added to the memory; and
   adding the entry to the memory in response to a determination that the entry can be added to the memory.

15. One or more computer-readable media having stored thereon a computer program that, when executed by one or more processors, causes the one or more processors to perform acts comprising:
   receiving and analyzing a single statement that comprises a fetch request for a record in a database table and an update request for updating at least one column;
   generating an execution plan to execute the analyzed statement, the execution plan including a locking time for preventing access to the record while the single statement is processed, the locking time ending once the single statement is processed and before the update request is made permanent;

matching an entry comprised of a record ID and a column ID with a column value corresponding to the column ID included in the entry, and storing the entry and column value matched with each other in a memory;

executing the execution plan by fetching the record in accordance with the fetch request and updating the at least one column according to the update request, wherein executing the execution plan includes, generating a transaction for updating after fetching the record;

updating a click count of content in the corresponding column;

updating the value recorded in the column;

updating the column value matched with the entry according to the update request, reflecting the column value kept in the memory on the database table in response to a specific condition being satisfied; and completing the transaction after updating, wherein a lock for the database table and record is set during the transaction for updating; and presenting the record in accordance with the fetch request.

16. A database-managing system comprising:

a processor; and a memory including instructions, which when executed by the processor, cause the processor to implement:

a query analyzer configured to receive and analyze a single statement that comprises a fetch request for a record in a database table and an update request for updating at least one column;

an execution plan generator configured to generate an execution plan to execute the analyzed statement, the generated execution plan including a locking time for preventing access to the record while the single statement is processed, the locking time ending once the single statement is processed and before the update request is made permanent;

an entry manager configured to match an entry comprised of a record ID and a column ID with the column value corresponding to the column ID included in the entry, and configured to store the entry and column value matched with each other in a memory;

an execution plan executor configured to execute the execution plan by fetching the record in accordance with the fetch request and updating the at least one column according to the update request, and during the updating the execution plan executor is configured to update the column value matched with the entry for the column in the memory, reflect the column value kept in the memory on the database table in response to a determination that a specific condition is satisfied, and update a click count of content in the corresponding column; and a presenter configured to present the record in accordance with the fetch request.

17. The database-managing system of claim 16, wherein the query analyzer comprises:

a query receiver configured to receive the statement;

a parser configured to parse the statement received by the query receiver; and a validation checker configured to check whether or not the parsed statement is valid, wherein the execution plan generator is configured to generate the execution plan for the statement determined as valid by the validation checker.

18. The database-managing system of claim 17, wherein the parser is configured to generate a parse tree for the statement through the use of parsing results, the validation checker is configured to check validation for the parse tree generated by the parser, and the execution plan generator is configured to generate an execution plan for the valid parse tree among the parse trees.

19. The database-managing system of claim 16, wherein the execution plan executor is configured to generate a transaction to execute the execution plan, configured to fetch the record from the database table in the transaction, configured to obtain a value recorded in the column among the fetched records, and configured to update the obtained value recorded in the column.

20. The database-managing system of claim 19, wherein the execution plan executor is configured to generate a sub-transaction for the update of the value recorded in the column during a period of processing the transaction, and is configured to perform the update of the value recorded in the column in the sub-transaction.

21. The database-managing system of claim 20, wherein the execution plan executor is configured to set a lock for the database table and record during a period of processing the sub-transaction.

22. The database-managing system of claim 16, wherein the execution plan executor is configured to reflect the column value on the database table in response to a determination that the column value kept in the memory is larger than a first reference value, or a determination that the column value is maintained for a time period longer than a second reference value from a finally-updated time point.

23. The database-managing system of claim 16, wherein the entry manager is configured to store the entry and column value in the memory through the use of a hash table.

24. The database-managing system of claim 16, wherein the execution plan executor is configured to determine whether the entry for the column exists, and configured to provide the entry-addition request for the column to the entry manager in response to a determination that there is no entry for the column; and the entry manager is configured to add the entry for the column corresponding to the entry-addition request.

25. The database-managing system of claim 24, wherein the entry manager is configured to determine whether the entry can be added to the entry in response to receiving the entry-addition request from the execution plan executor; configured to delete any one of the entries stored in the memory in response to a determination that the entry cannot be added to the memory; and configured to add the entry for the column to the memory.

* * * * *